United States Patent
Hawley et al.

(10) Patent No.: US 11,514,795 B1
(45) Date of Patent: Nov. 29, 2022

(54) SYSTEMS AND METHODS OF PROJECTING VIRTUAL PARKING LINES

(71) Applicant: Ford Global Technologies, LLC, Dearborn, MI (US)

(72) Inventors: Taylor Hawley, Oak Park, MI (US); Jeremy Lerner, Southfield, MI (US); James Issac, Ann Arbor, MI (US); Scott Huggins, Novi, MI (US); Xingping Chen, Troy, MI (US); Ryan Jones, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 17/323,851

(22) Filed: May 18, 2021

(51) Int. Cl.
| | |
|---|---|
| *H04N 5/44* | (2011.01) |
| *G08G 1/16* | (2006.01) |
| *B60W 30/06* | (2006.01) |
| *B62D 15/02* | (2006.01) |

(52) U.S. Cl.
CPC ............ *G08G 1/168* (2013.01); *B60W 30/06* (2013.01); *B62D 15/0285* (2013.01); *B60R 2300/806* (2013.01)

(58) Field of Classification Search
CPC ... G08G 1/168; B60W 30/06; B62D 15/0285; B60R 2300/806
See application file for complete search history.

(56) References Cited

U.S. PATENT DOCUMENTS

| | | | | |
|---|---|---|---|---|
| 2017/0206786 | A1* | 7/2017 | Dhondse | G08G 1/143 |
| 2018/0099661 | A1* | 4/2018 | Bae | B62D 15/0285 |
| 2018/0215413 | A1* | 8/2018 | Inagaki | B62D 15/0285 |
| 2018/0315312 | A1* | 11/2018 | Hayakawa | G08G 1/143 |
| 2020/0117927 | A1* | 4/2020 | Oba | H04N 7/183 |
| 2021/0179085 | A1* | 6/2021 | Nakada | B60W 40/076 |
| 2021/0276543 | A1* | 9/2021 | Wang | G06V 20/58 |

FOREIGN PATENT DOCUMENTS

| | | |
|---|---|---|
| CN | 109697860 A | 10/2017 |
| CN | 109841087 A | 4/2019 |
| CN | 110148307 A | 4/2019 |

OTHER PUBLICATIONS

N. Bibi et al. "Automatic Parking Space Detection System" (Oct. 2017).
S. Mathur "Parknet: Drive-By Sensing of Road-Side Parking Statistics" (Jun. 2010).

* cited by examiner

*Primary Examiner* — Munear T Akki
(74) *Attorney, Agent, or Firm* — Brandon Hicks; Eversheds Sutherland (US) LLP

(57) ABSTRACT

Disclosed are systems and methods for projecting virtual parking lines in alignment with actual parking lines to facilitate parking within a parking stall defined by the actual parking lines to prevent unnecessary damage to vehicles in an area where the actual parking lines may not exist or be visible. The system identifies the location of the actual parking lines within a defined parking area based on previously recorded actual parking line data as well as localization of the vehicle within the defined parking area relative to the nearby landmarks. Virtual parking lines are generated that correspond with the location of the actual parking lines and are projected in alignment with the actual parking lines to facilitate parking.

20 Claims, 9 Drawing Sheets

SYSTEMS AND METHODS OF PROJECTING VIRTUAL PARKING LINES

BACKGROUND

In a parking area with no marked parking stalls or degraded lane stripes, drivers may be frustrated by the risk of damage or inconvenience associated with cramped, unmarked parking. Particularly, in urban areas with congested street parking, a vehicle easily may become trapped by other vehicles in the front and back. Additionally, drivers with disabilities often struggle to maintain enough distance between vehicles so as to allow sufficient space for easy entry and exit. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
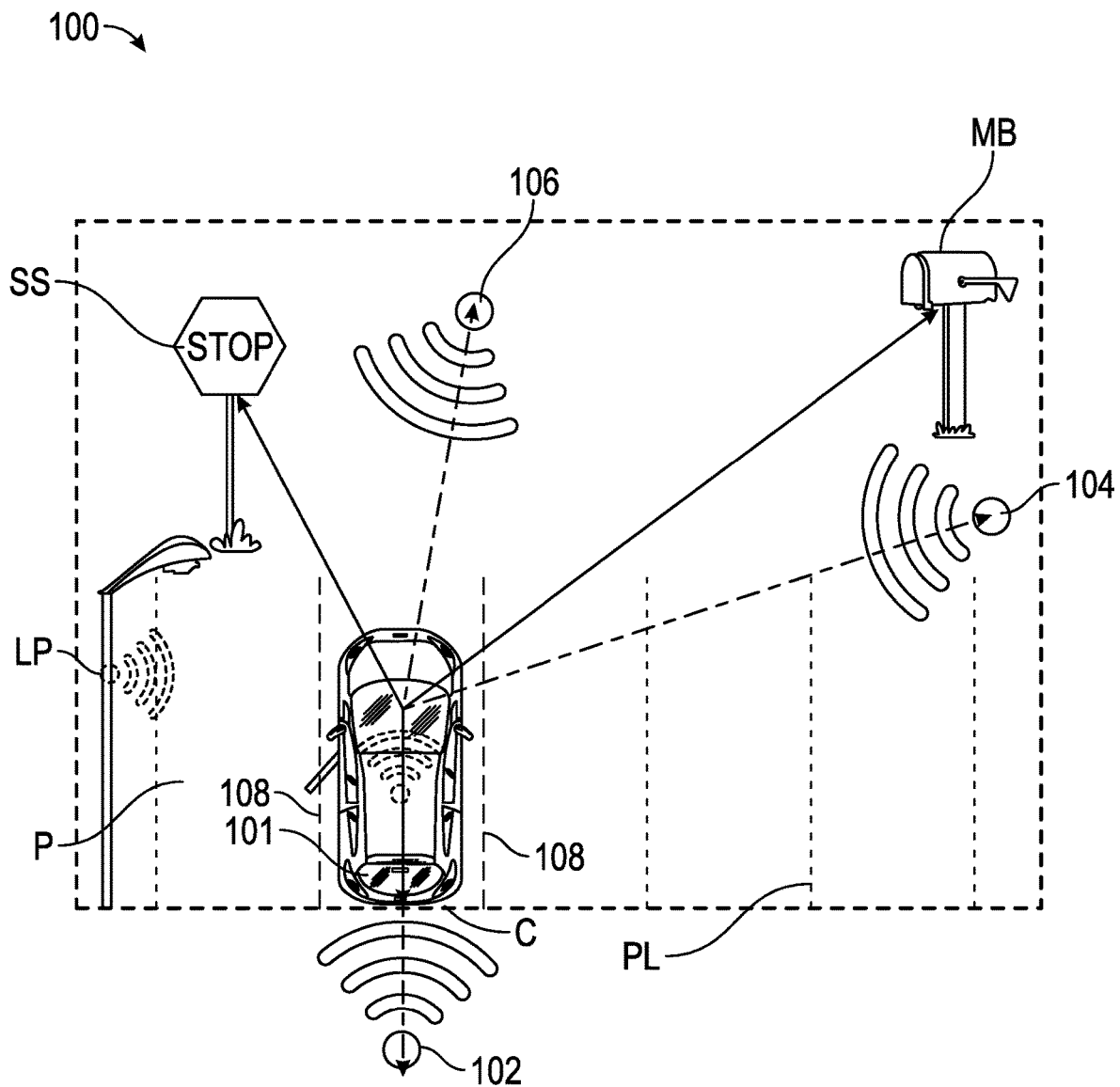
FIG. 1 illustrates a system for projecting parking lines in accordance with the principles of the present disclosure.

Disclosed are customizable systems and methods to prevent unnecessary damage to vehicles whereby a proximity fence is projected surrounding the vehicle on any one of or all four sides. That is, a virtual parking stall may be established in an area where a physical parking stall on a surface such as the ground may not necessarily exist, or where a parking stall exists, but is not visible due to conditions such as snow or degradation of lane stripes. For example, if the vehicle does not detect physical parking stall lines, the vehicle may project parking lines around the vehicle. The projection system may be based, e.g., in the side mirrors as projectors, and may utilize a lane detection system. The projection system may automatically engage when no lane lines are detected and/or when another vehicle is approaching (based on a radar, ultrasonic, camera, other vehicle sensor, or CV2X signal), thus saving battery life and ensuring a positive user experience.

The system also may be used in conjunction with parking assistance features, enabling the vehicle to orient itself relative to the other vehicles in the parking area. Accordingly, all parked vehicles may be parked as close to parallel as possible, minimizing the wasted space in the parking area by calibrated vehicle boundaries. For example, parked vehicles may be parked parallel to each other while perpendicular to the curb (or other marker), or parallel to each other while angled relative to the curb (or other marker) to enhance maneuverability of the vehicles. Projecting parking lines from vehicles parked in parallel can assist the driver of the host vehicle as well as other drivers in the parking lot to allow for the appropriate amount of space for other vehicles to enter and leave their respective parking spaces as well as maximize the number of parking spaces available.

Users may be provided several options for the color and shape of the projected parking lines, and may include graphics such as a handicapped zone and/or a no parking zone. The system may passively encourage other drivers to avoid parking too close to the vehicle on any of the four sides. The minimum length in the front of a vehicle to successfully depart from a parking spot also may be calculated based on, e.g., the vehicle size, turning radius, and closures to ensure minimal space requirements.

Markings on areas where parking is not allowed (e.g. fire lanes, near dumpsters, loading and unloading zones, etc.) may be occluded by snow and/or other temporary issues. These locations may be detected by the vehicle, uploaded by the vehicle from an online database, provided by local parking lot owners in advance, or by V2X infrastructure on demand, so that the appropriate parking lines may be projected if a driver attempts to park there. For example, when parking lines are occluded, the parking lines may be projected in actual parking stalls, and a warning graphic (e.g. a red X on the ground) may be projected on the ground if the driver attempts to park in a location that is not actually a parking stall. Curbs similarly may be projected (e.g. via a bright color) so that when the curbs are snow covered the driver is made aware of the physical location of the curb such that they can avoid bumping into the curb.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, system 100 for projecting parking lines is provided. System 100 may include vehicle 101 having parking line projection platform 200 described in further detail below with regard to FIG. 2, and which may communicate with one or more nearby wireless access points, such as Bluetooth or WiFi access points, e.g., access point 102, 104, and 106, or a network, as well as with nearby physical structures, e.g., mailbox MB, stop sign SS, curb C, and/or lamppost LP, via sensor-based localization and/or vehicle-to-everything (V2X) communication, to localize vehicle 101 within a defined parking area, e.g., a parking lot. As will be understood by a person having ordinary skill in the art, there may be more or less than three wireless access points, and vehicle 101 may communicate with additional physical structures not shown.

As shown in FIG. 1, the parking area may include pavement P, with actual parking lines PL. Parking lines PL may not be readily visible, e.g., faded or covered by snow. Accordingly, system 100 may be used by vehicle 101 to project virtual parking lines 108 to facilitate parking of vehicle 101 within the actual parking stall defined by actual parking lines PL.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies, e.g., adaptive cruise control. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, parking line projection platform 200 may be configured and/or programmed to operate with a vehicle having a Level-4 or Level-5 autonomous vehicle controller.

Figure 2:
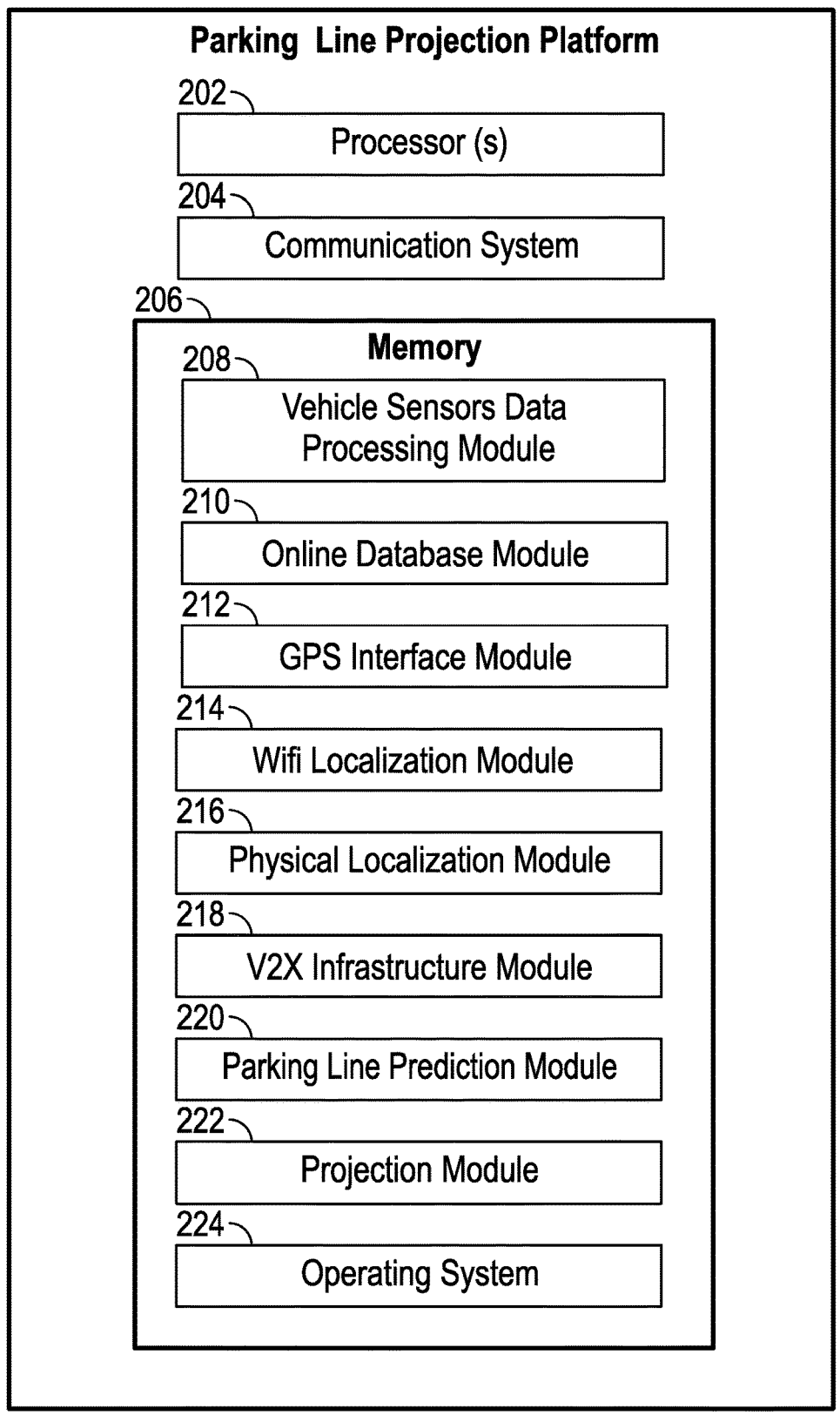
FIG. 2 shows some example components that may be included in a parking line prediction platform in accordance with the principles of the present disclosure.

Referring now to FIG. 2, components that may be included in parking line projection platform 200 are described in further detail. Parking line projection platform 200 may be integrated with the control system of vehicle 101, and may include one or more processors 202, communication system 204, and memory 206.

Memory 206, which is one example of a non-transitory computer-readable medium, may be used to store operating system (OS) 224, vehicle sensors data processing module 208, online database module 210, GPS interface module 212, WiFi localization module 214, physical localization module 216, V2X infrastructure module 218, parking line prediction module 220, and projection module 222. The modules are provided in the form of computer-executable instructions that may be executed by processor 202 for performing various operations in accordance with the disclosure.

Vehicle sensors data processing module 208 may be executed by processor 202 for receiving data from vehicle sensors of vehicle 101, e.g., one or more cameras, radar, ultrasonic sensors, etc., indicative of actual parking lines within a defined parking area, as well as their relative distance to nearby static landmarks, e.g., physical structures. For example, the vehicle sensors may capture and record image data indicative of the actual parking lines when the actual parking lines are not obscured or otherwise covered, as well as other physical components in the parking area such as a curb. Thus, the location of actual parking lines may be recorded relative to nearby static landmarks upon driver request to remember a particular defined parking area, which provides extremely accurate localization based on nearby landmarks.

Online database module 210 may be executed by processor 202 for receiving information regarding a defined parking area from an online database. For example, online database module 210 may receive data indicative of the location of actual parking lines within a defined parking area including, e.g., no parking zones, provided by the owner/manager of the parking area or a government office. No parking zones may include areas within the defined parking area where a vehicle may not be parked and/or may include areas with restricted parking access such as handicap zones, parking stalls with a time-limit, etc. In addition, online database module 210 may receive crowdsourced information uploaded to the online database from other vehicles regarding a defined parking area. Thus, if vehicle 101 has not previously been to a defined parking area, such that vehicle sensors data processing module 208 has not had the opportunity to record image data indicative of the actual parking lines of the defined parking area, online database module 210 may receive such information from the online database, if available. Moreover, online database module 210 may upload image data recorded by vehicle sensors data processing module 208 to the online database for other vehicles to download.

GPS interface module 212 may be executed by processor 202 for receiving GPS location data of vehicle 101 from a GPS system of vehicle 101. GPS interface module 212 may use the GPS location data to localize vehicle 101 within a defined parking area.

WiFi localization module 214 may be executed by processor 202 for receiving data indicative of localization of vehicle 101 from one or more nearby wireless access points, such as Bluetooth or WiFi access points, e.g., access points 102, 104, and/or 106. WiFi localization module 214 may use the data received from the wireless access points to localize vehicle 101 within a defined parking area, e.g., relative to the wireless access points.

Physical localization module 216 may be executed by processor 202 for receiving data indicative of the location of nearby physical structures from one or more onboard vehicle sensors. For example, the onboard vehicle sensors may include image processing, radar, LiDAR, etc. to generate data indicative of the location of the nearby physical structures. Physical localization module 216 may use the data received from the onboard vehicle sensors to localize vehicle 101 within a defined parking area, e.g., relative to the nearby physical structures.

V2X infrastructure module 218 may be executed by processor 202 for receiving data indicative of localization of vehicle 101 from a V2X infrastructure. The V2X infrastructure may have a record of all parking stall locations and the data received therefrom may be used by V2X infrastructure module 218 to direct vehicle 101 to those locations. Moreover, the data may be used by V2X infrastructure module 218 to facilitate projection of the virtual parking lines relative to the exact location of vehicle 101 as detected by fixed sensors.

Parking line prediction module 220 may be executed by processor 202 for generating virtual parking lines that correspond with the actual parking lines based on at least one of recorded image data received by vehicle sensors data processing module 208, the data indicative of the location of actual parking lines received by online database module 210, the GPS location data received by GPS interface module 212, the wireless access points data received by WiFi localization module 214, the location data of the nearby physical structures received from physical localization module 216, or the record of parking stall locations received by V2X infrastructure module 218. Specifically, parking line prediction module 220 may predict where the actual parking lines are located within a defined parking area based on previously recorded image data indicative of where the actual parking lines are relative to nearby physical structures. Accordingly, vehicle 101 may be localized within the defined parking area by any combination of the techniques described above, e.g., GPS localization, physical structure localization, wireless, e.g., WiFi, access point localization, V2X infrastructure localization, such that the location of the actual parking lines may be determined relative to the location of vehicle 101 within the defined parking area.

Moreover, parking line prediction module 220 may generate virtual parking lines that include a virtual curb graphic that corresponds to the location of an actual curb based on the previously recorded image data received by vehicle sensors data processing module 208. In addition, parking line prediction module 220 may generate virtual parking lines that include graphics indicating no parking zones based on the data received by online database module 210. For example, parking line prediction module 220 may generate virtual parking lines that include a red box to indicate a no parking zone, or a blue handicap graphic indicating a handicap zone. Parking line prediction module 220 may be selectively preprogrammed by a user to generate customized virtual parking lines in various colors.

Parking line prediction module 220 further may generate virtual parking lines that provide sufficient space for vehicle 101 to enter and exit the parking stall defined by the virtual parking lines, and minimize wasted parking space in the parking area by calibrated vehicle boundaries, e.g., when parallel parking. Accordingly, parking line prediction module 220 may take into account the vehicle's turning radius, size, and boundary closures. In addition, parking line prediction module 220 may take into account the driver's preferences. For example, the driver may input data indicative of their parking preferences, such as extra space on the driver's side, or less space on the passenger side of vehicle 101, e.g., when vehicle 101 has no occupants other than the driver.

Projection module 222 may be executed by processor 202 for instructing one or more projectors, e.g., based in the side mirrors of vehicle 101, to project the generated virtual parking lines in alignment with the location of the actual parking lines to thereby facilitate parking of vehicle 101 within the parking stall defined by the actual parking lines.

Figure 3:
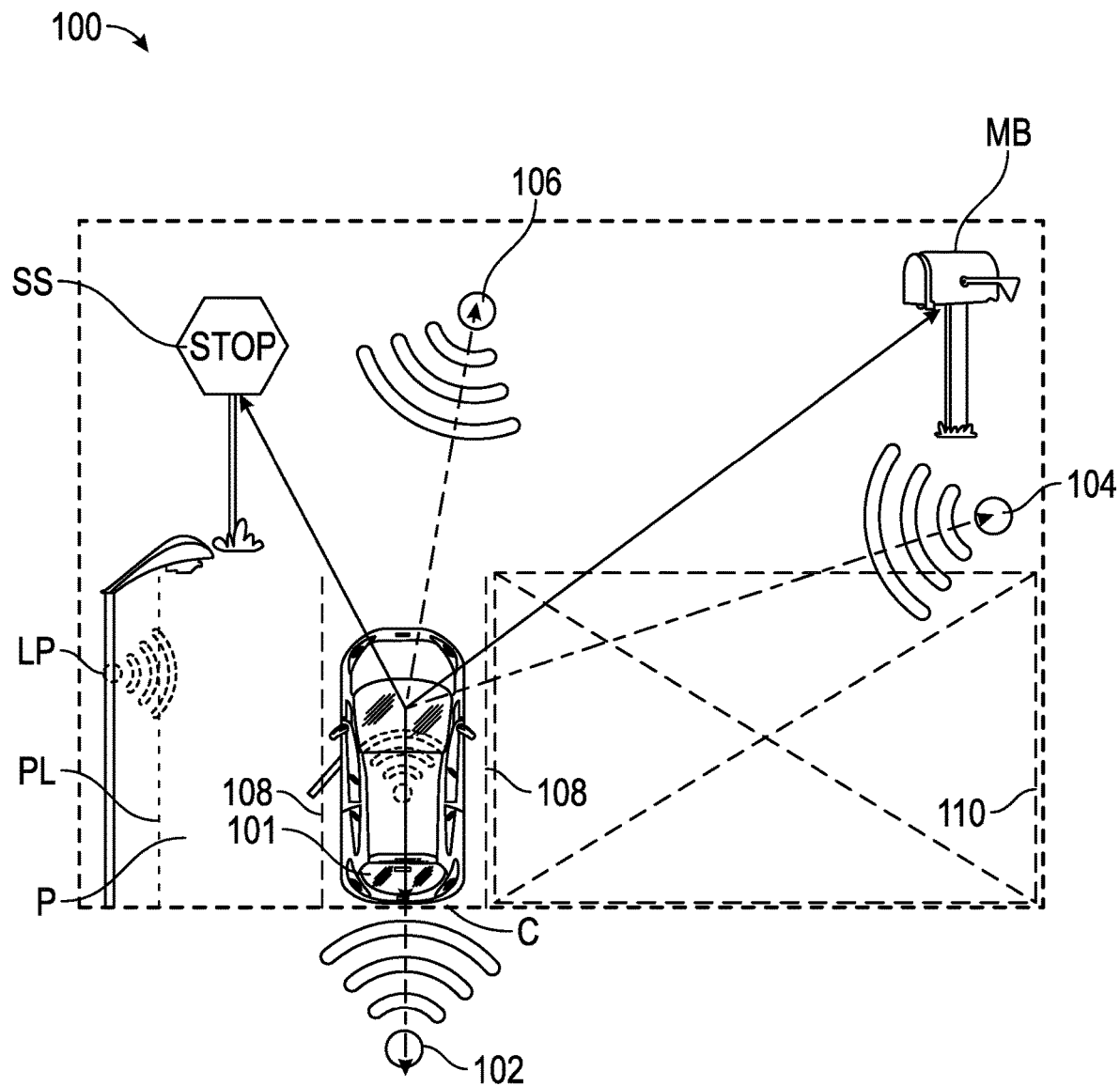
FIG. 3 illustrates a system for projecting parking lines including a no parking zone in accordance with the principles of the present disclosure.
Figure 4:
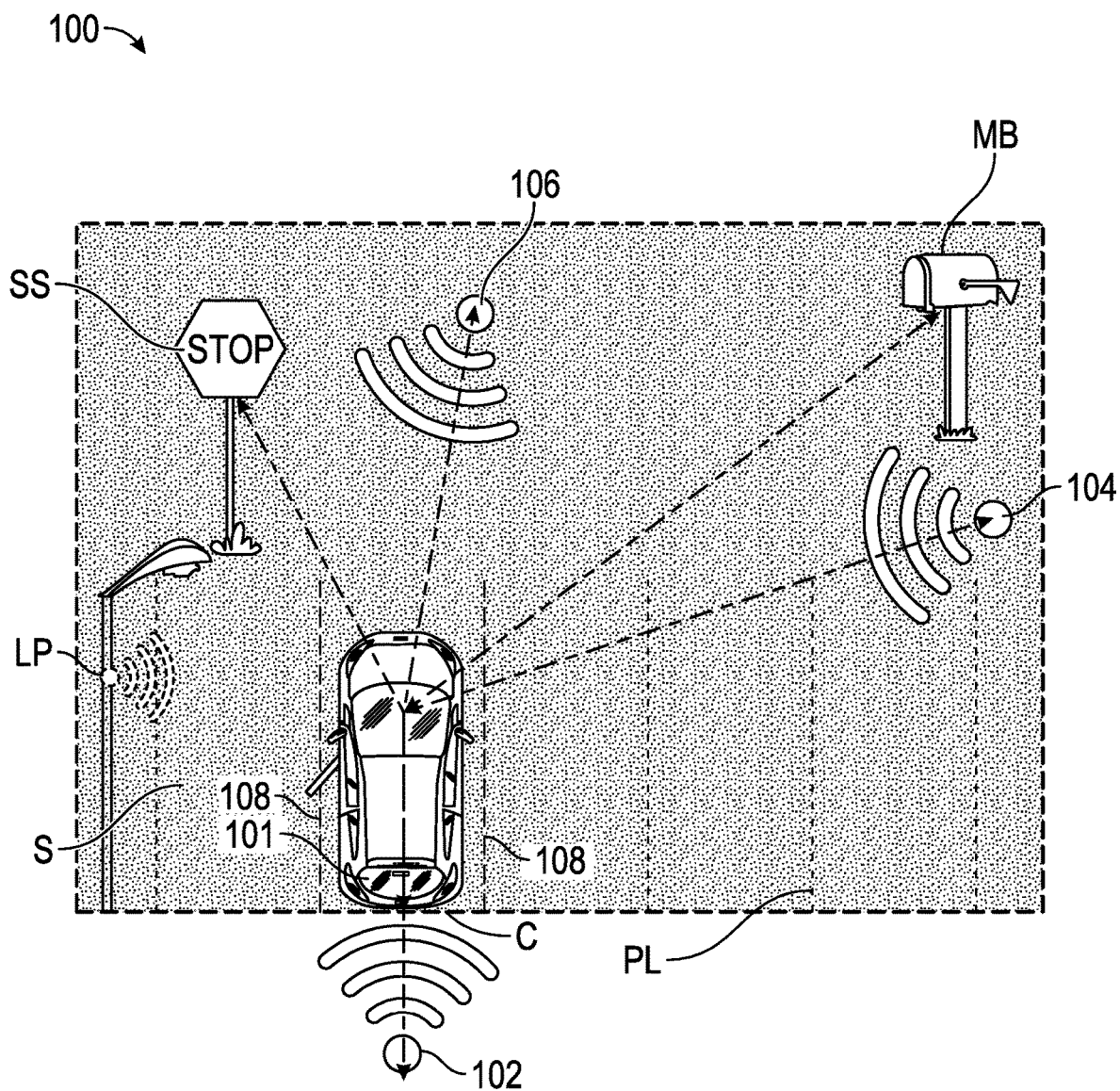
FIG. 4 illustrates a system for projecting parking lines with snow in accordance with the principles of the present disclosure.

FIG. 3 illustrates vehicle 101 using system 100 to project virtual parking lines 108, which includes red box 110 indicating a no parking zone. Accordingly, the driver of vehicle 101 will know they are not supposed to park within box 110. FIG. 4 illustrates vehicle 101 using system 100 to project virtual parking lines 108 on a surface, e.g., a ground covered in snow S, which obscures actual parking lines PL. System 100 determines the location of actual parking lines PL based on localization of vehicle 101 and actual parking lines PL, e.g., via any combination of wireless access point localization with access points 102, 104, and/or 106, physical structure localization with mailbox MB, stop sign SS, and/or curb C, or V2X communication with lamppost LP, such that system 100 may project virtual parking lines 108 in alignment with actual parking lines PL.

Figure 5A:
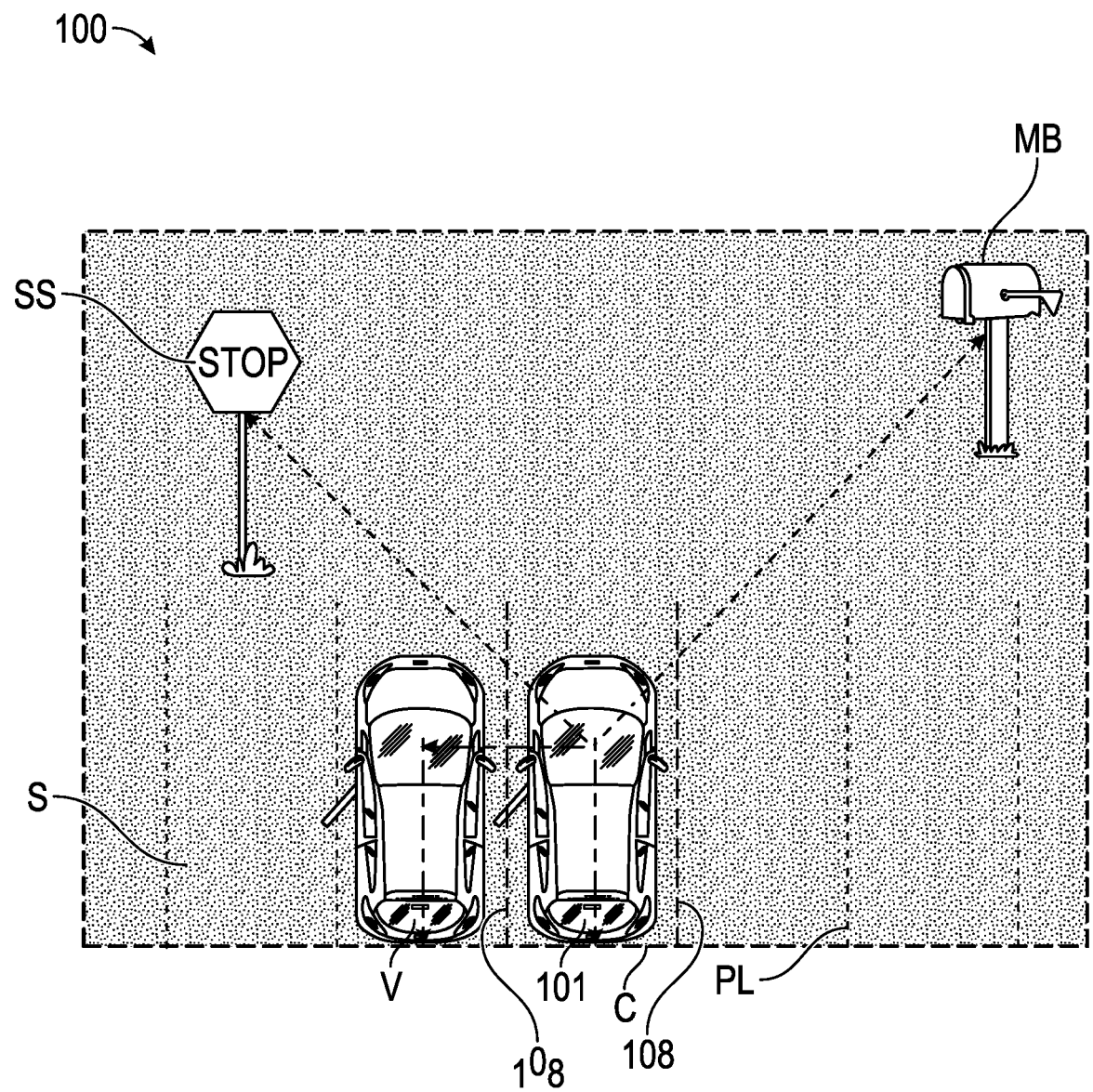
FIGS. 5A and 5B illustrate a system for projecting parking lines adjacent to a parked vehicle in accordance with the principles of the present disclosure.
Figure 5B:
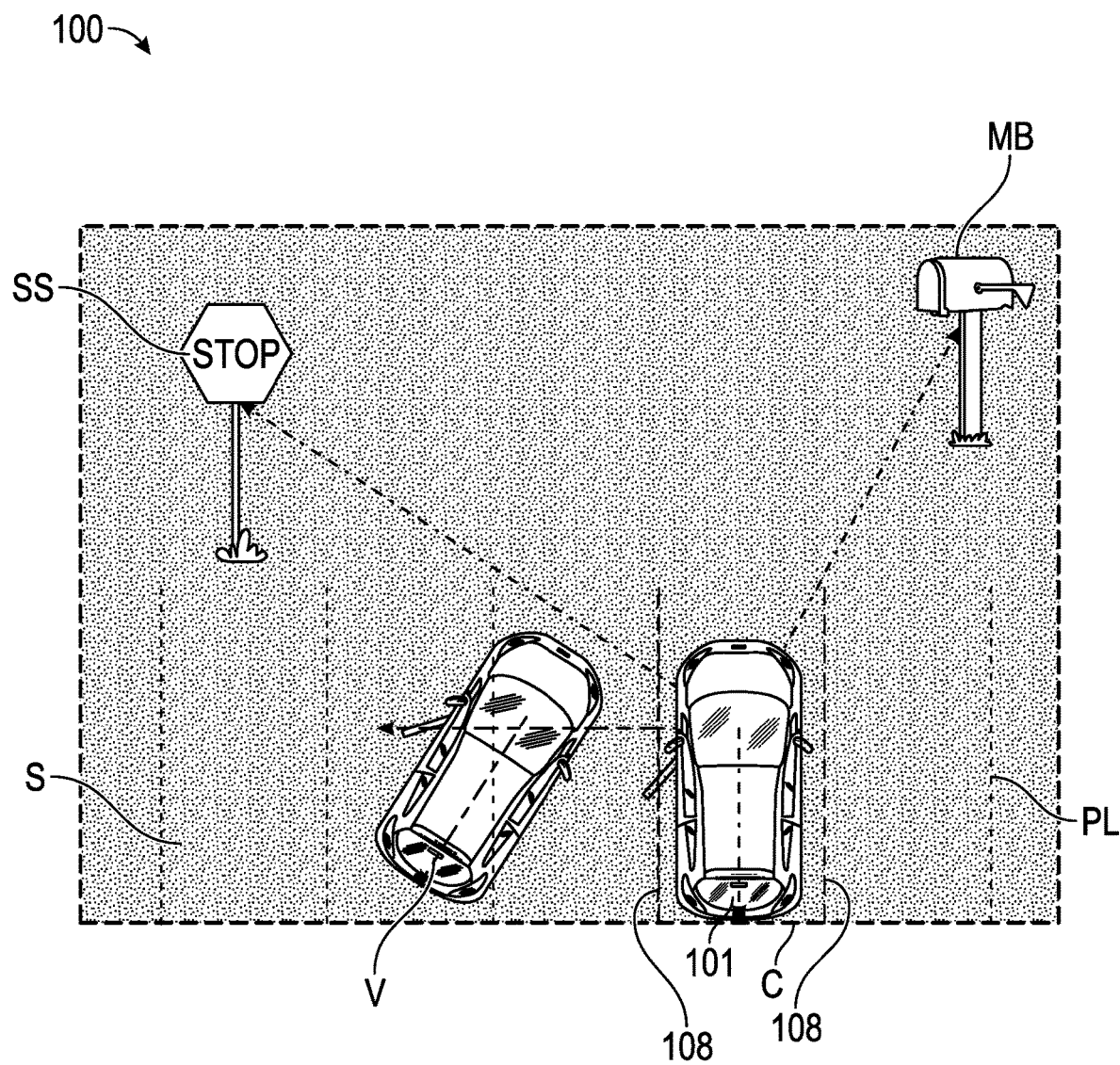

As shown in FIGS. 5A and 5B, system 100 may take into account other parked vehicles in the defined parking area. For example, as shown in FIG. 5A, vehicle 101 may detect and localize vehicle V adjacent to vehicle 101, and determine the distance vehicle V is from actual parking lines PL as well as nearby landmarks, e.g., stop sign SS, mailbox MB, and curb C, to thereby project virtual parking lines 108 accordingly in alignment with actual parking lines PL. As shown in FIG. 5B, system 100 may take into account vehicle V parked at an angle and project virtual parking lines 108 accordingly in alignment with actual parking lines PL.

Figure 6:
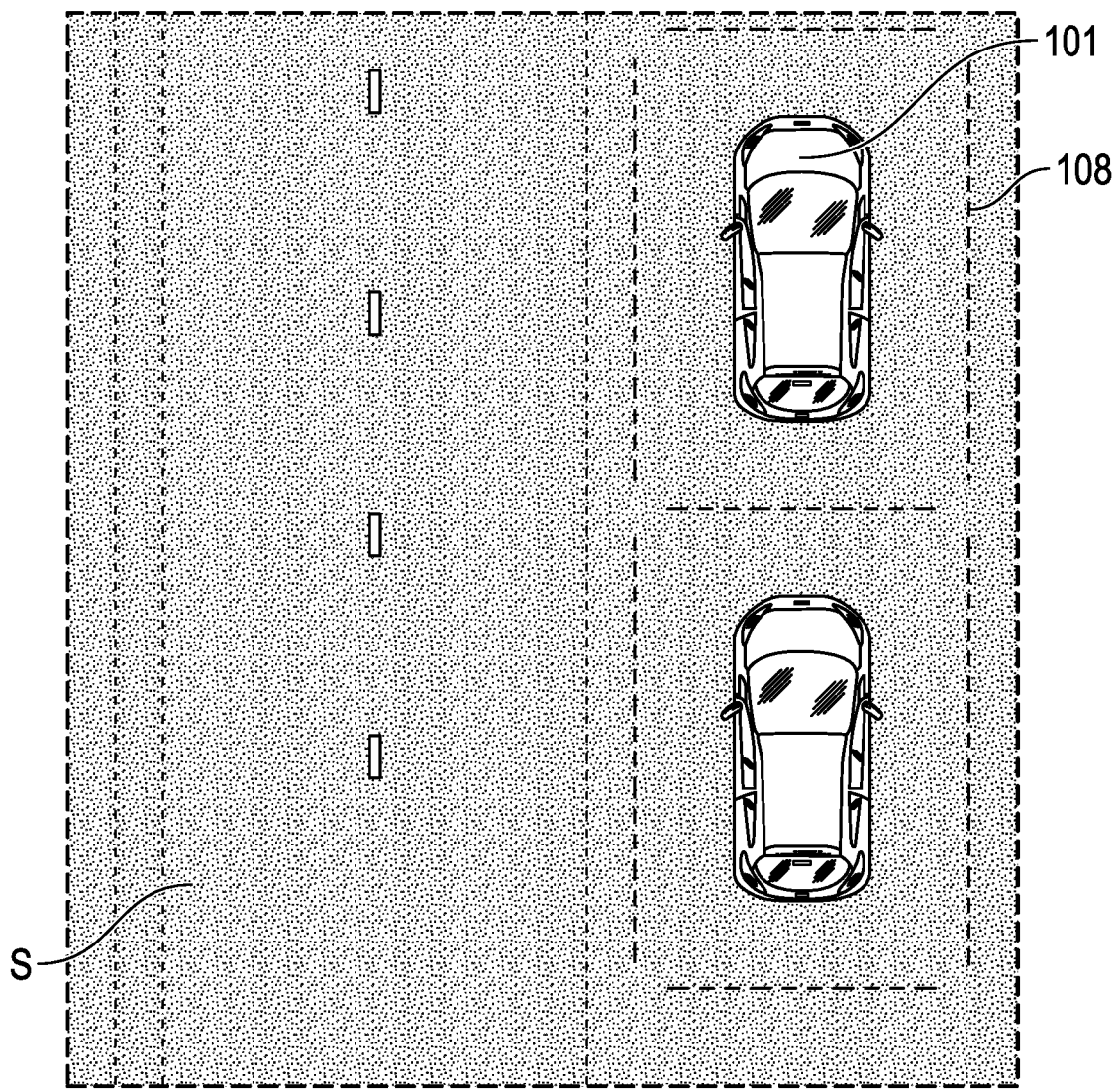
FIG. 6 illustrates a system for projecting parallel parking lines in accordance with the principles of the present disclosure.

As shown in FIG. 6, virtual parking lines 108 may be projected to facilitate parallel parking. Projecting virtual parking lines from vehicle 101 parked in parallel may assist the driver of vehicle 101 as well as other drivers in parking to allow for the appropriate amount of space for other vehicles to enter and leave parking spaces as well as maximize the number of parking spaces available. Thus, when actual parking lines do not exist, parking line prediction module 220 may generate virtual parking lines based on data indicative of nearby physical structures such as the curb and/or other parked vehicles, as well as the localization of vehicle 101 relative to the physical structures, and project the virtual parking lines on the ground to facilitate parking of vehicle 101.

Figure 7A:
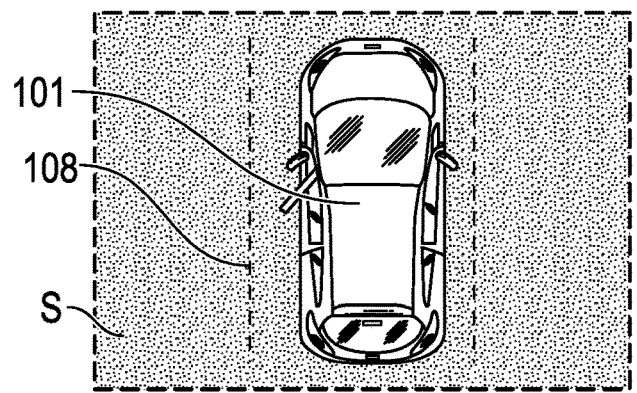
FIGS. 7A to 7D illustrate various exemplary parking line projections in accordance with the principles of the present disclosure.
Figure 7B:
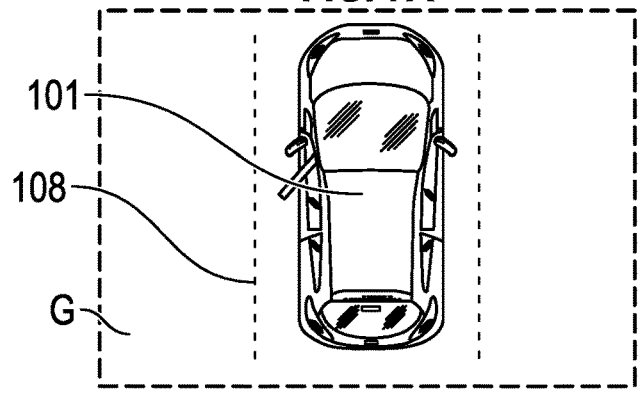
Figure 7C:
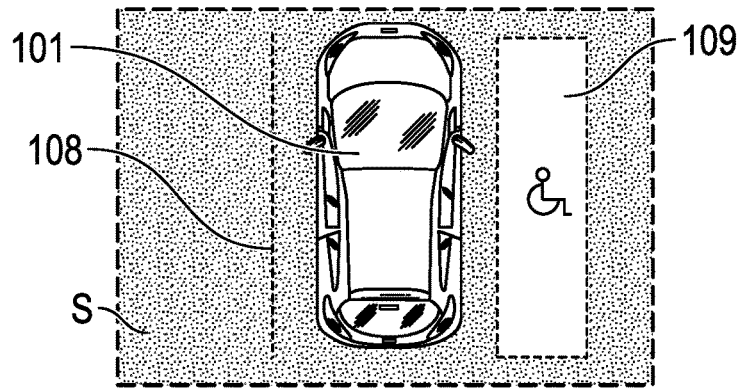
Figure 7D:
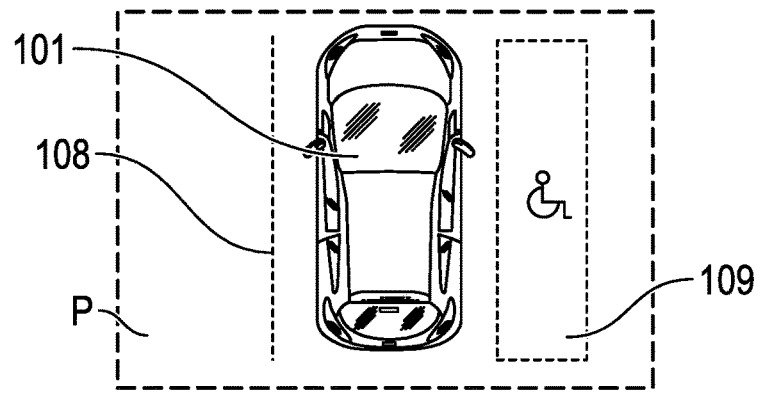

FIG. 7A illustrates virtual parking lines 108 projected by vehicle 101 on a ground covered by snow S. FIG. 7B illustrates virtual parking lines 108 projected by vehicle 101 on a ground comprising gravel G. FIG. 7C illustrates virtual parking lines 108 projected by vehicle 101 on a ground covered by snow S, which includes handicap graphic 109 indicating a handicap parking zone. FIG. 7D illustrates virtual parking lines 108 projected by vehicle 101 on a ground comprising pavement P, which includes handicap graphic 109 indicating a handicap parking zone.

Figure 8:
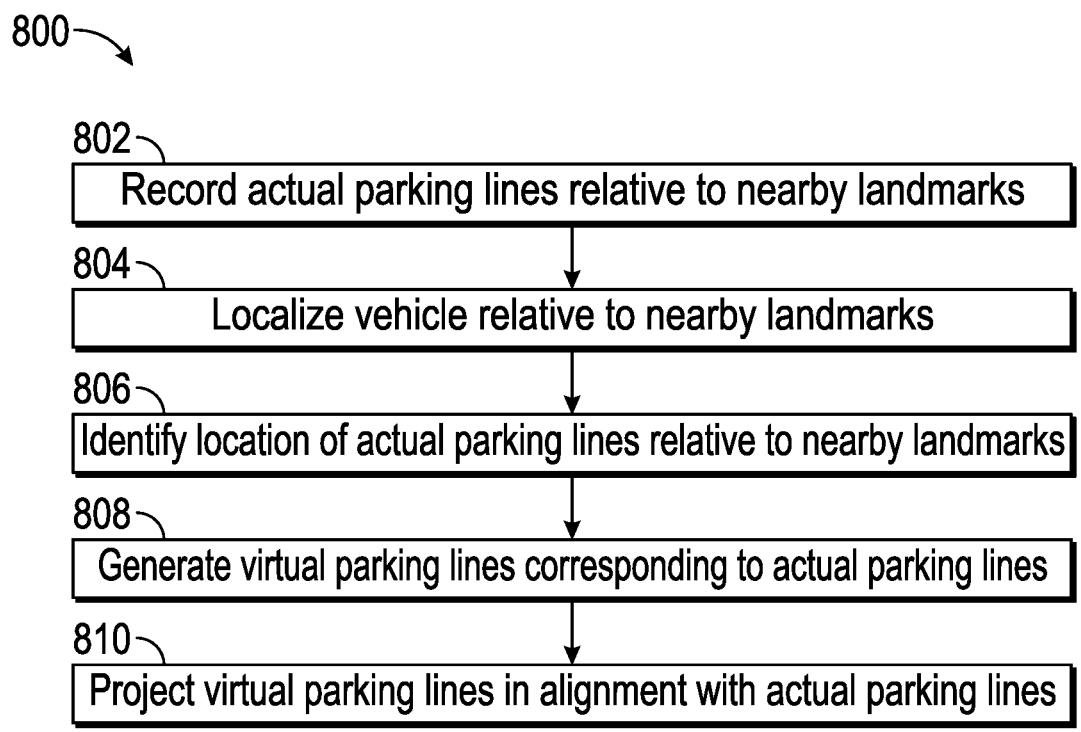
FIG. 8 is a flow chart illustrating exemplary steps for projecting parking lines in accordance with the principles of the present disclosure.

Referring now to FIG. 8, method 800 for projecting parking lines is provided. At step 802, vehicle 101 records actual parking lines within a defined parking area as well as their location relative to one or more nearby landmarks. Alternatively, or additionally, vehicle 101 may download records of the actual parking lines within the defined parking area from an online database such as the cloud. These records may be uploaded by other vehicles, or by an owner/manager of the defined parking area, such that every vehicle may benefit from the crowdsourced information. Accordingly, vehicle 101 also may upload recorded data such that another vehicle that may not have previously been to the defined parking area, may download the records generated by vehicle 101 for the defined parking area.

At step 804, when the actual parking lines of the defined parking area are not visible or otherwise obscured, e.g., faded or covered by snow, vehicle 101 may be localized within the defined parking area relative to the nearby landmarks using one or more of the localization techniques described above such as GPS location data, physical structure localization, wireless access point localization, and/or V2X infrastructure localization.

At step 806, system 100 identifies the location of the actual parking lines within the defined parking area based on the previously recorded actual parking line data as well as the localization of vehicle 101 within the defined parking area relative to the nearby landmarks. At step 808, system 100 generates virtual parking lines that correspond with the location of the actual parking lines. The user may customize the virtual parking lines, such as by selecting the color of the virtual parking lines. At step 810, vehicle 101 projects the virtual parking lines in alignment with the actual parking lines to facilitate parking within the parking stall defined by the actual parking lines.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A method for projecting parking lines on a surface outside of a vehicle, the method comprising:
   recording, by a processor, actual parking lines on the surface relative to one or more landmarks;
   localizing, by the processor, the vehicle relative to the one or more landmarks;
   identifying, by the processor, a location of the actual parking lines relative to the one or more landmarks based on the recorded actual parking lines and the localization of the vehicle;
   generating, by the processor, virtual parking lines corresponding to the actual parking lines based on the identified location of the actual parking lines; and
   projecting on the surface outside of the vehicle, by a projector, the virtual parking lines in alignment with the location of the actual parking lines to facilitate parking of the vehicle within the actual parking lines.

2. The method of claim 1, wherein recording actual parking lines on the surface relative to one or more landmarks comprises downloading data indicative of the actual parking lines from a database.

3. The method of claim 1, wherein localizing the vehicle relative to the one or more landmarks comprises using GPS location data of the vehicle to localize the vehicle relative to the one or more landmarks.

4. The method of claim 1, wherein localizing the vehicle relative to the one or more landmarks comprises using one or more wireless access points to localize the vehicle relative to the one or more landmarks.

5. The method of claim 1, wherein localizing the vehicle relative to the one or more landmarks comprises detecting nearby physical structures to localize the vehicle relative to the actual parking lines.

6. The method of claim 1, wherein localizing the vehicle relative to the one or more landmarks comprises using a V2X infrastructure to localize the vehicle relative to the actual parking lines.

7. The method of claim 1, further comprising localizing a second vehicle relative to the vehicle, wherein identifying the location of the actual parking lines relative to the one or more landmarks comprises identifying the location of the actual parking lines relative to the one or more landmarks based on the localization of the second vehicle relative to the vehicle.

8. A system for projecting parking lines on a surface, the system comprising:
   a vehicle comprising one or more sensors configured to generate data indicative of localization of the vehicle relative to one or more nearby physical structures;
   a memory that stores computer-executable instructions; and
   a processor configured to access the memory and execute the computer-executable instructions to:
      record actual parking lines on the surface relative to the one or more nearby physical structures;
      generate virtual parking lines based on the data indicative of localization of the vehicle relative to one or more nearby physical structures; and
      cause one or more projectors of the vehicle to project the virtual parking lines on the surface outside of the vehicle relative to the one or more nearby physical structures to facilitate parking of the vehicle adjacent to the one or more nearby physical structures within the virtual parking lines.

9. A system for projecting parking lines on a surface, the system comprising:
   a vehicle comprising:
      a device configured to record actual parking lines on a surface relative to one or more landmarks and generate data indicative of a location of the actual parking lines;
      one or more sensors configured to generate data indicative of localization of the vehicle; and
      one or more projectors;
   a memory that stores computer-executable instructions; and
   a processor configured to access the memory and execute the computer-executable instructions to:
      identify the location of the actual parking lines relative to the one or more landmarks based on the data indicative of the location of the actual parking lines and the data indicative of localization of the vehicle;
      generate virtual parking lines corresponding to the actual parking lines based on the identified location of the actual parking lines; and
      cause the one or more projectors to project the virtual parking lines on the surface outside of the vehicle in alignment with the location of actual parking lines to facilitate parking of the vehicle within the actual parking lines.

10. The system of claim 9, wherein the device is configured to record actual parking lines on the surface from an online database.

11. The system of claim 9, wherein at least one of the one or more sensors comprises a GPS system configured to localize the vehicle relative to the actual parking lines.

12. The system of claim 9, wherein at least one of the one or more sensors are configured to use one or more wireless access points to localize the vehicle relative to the actual parking lines.

13. The system of claim 9, wherein at least one of the one or more sensors comprises sensors configured to detect nearby physical structures to localize the vehicle relative to the actual parking lines.

14. The system of claim 9, wherein at least one of the one or more sensors comprises a V2X infrastructure comprising a record of the actual parking lines to localize the vehicle relative to the actual parking lines.

15. The system of claim 9, wherein the virtual parking lines comprise a graphic.

16. The system of claim 15, wherein the graphic is indicative of a no parking zone.

17. The system of claim 15, wherein the graphic is indicative of a handicap zone.

18. The system of claim 9, wherein the one or more projectors are coupled to a side mirror of the vehicle.

19. The system of claim 9, wherein the device is further configured to record an actual curb relative to one or more landmarks and generate data indicative of a location of the actual curb, wherein the one or more sensors are further configured to generate data indicative of localization of the vehicle relative to the actual curb, and wherein the processor is configured to:

identify the location of the actual curb relative to the one or more landmarks based on the data indicative of the location of the actual curb and the data indicative of localization of the vehicle relative to the actual curb;

generate a virtual curb graphic corresponding to the actual curb based on the identified location of the actual curb; and project the virtual curb graphic in alignment with the location of actual curb to facilitate parking of the vehicle within the actual parking lines.

20. The system of claim 9, wherein the one or more sensors are further configured to generate data indicative of localization of a second vehicle relative to the vehicle, and wherein the processor is configured to identify the location of the actual parking lines relative to the one or more landmarks based on the data indicative of localization of the second vehicle relative to the vehicle.

\* \* \* \* \*